US012753794B2

(12) United States Patent
Niermann et al.

(10) Patent No.: US 12,753,794 B2
(45) Date of Patent: Oct. 6, 2026

(54) PRECISION SLIDING BEARING

(71) Applicant: igus SE & Co. KG, Cologne (DE)

(72) Inventors: Stefan Niermann, Cologne (DE); Marco Jaekel, Langenfeld (DE); Fabian Kleine, Pulheim (DE); Sebastian Polle, Rösrath (DE); Johannes Ruge, Cologne (DE); Muhammet Erkam Türker, Nörvenich (DE)

( * ) Notice: Subject to any disclaimer, the term of this patent is extended or adjusted under 35 U.S.C. 154(b) by 153 days.

(21) Appl. No.: 18/286,112

(22) PCT Filed: Apr. 8, 2022

(86) PCT No.: PCT/EP2022/059520
§ 371 (c)(1),
(2) Date: Dec. 21, 2023

(87) PCT Pub. No.: WO2022/218880
PCT Pub. Date: Oct. 20, 2022

(65) Prior Publication Data

US 2024/0191746 A1 Jun. 13, 2024

(30) Foreign Application Priority Data

Apr. 12, 2021 (DE) .................... 20 2021 101 949.2

(51) Int. Cl.
*F16C 17/02* (2006.01)

(52) U.S. Cl.
CPC .................................... *F16C 17/02* (2013.01)

(58) Field of Classification Search
CPC .......... F16C 17/02; F16C 33/02; F16C 33/04; F16C 33/046; F16C 33/08; F16C 2226/12
See application file for complete search history.

(56) References Cited

U.S. PATENT DOCUMENTS

| | | | | |
|---|---|---|---|---|
| 1,700,100 A * | 1/1929 | Smith | ..................... | F16C 33/08 29/898.07 |
| 2,371,399 A * | 3/1945 | Mantle | ..................... | F16C 9/04 29/898.059 |

(Continued)

FOREIGN PATENT DOCUMENTS

| | | |
|---|---|---|
| CN | 202280738 U | 6/2012 |
| DE | 3249706 C2 | 9/1987 |

(Continued)

OTHER PUBLICATIONS

Translation of WO2020039880 obtained Oct. 7, 2025.*

(Continued)

*Primary Examiner* — James Pilkington
(74) *Attorney, Agent, or Firm* — Cahn & Samuels, LLP

(57) ABSTRACT

A sliding bearing includes a bearing body in the manner of a hollow cylinder produced from a base material, which defines a feedthrough. An antifriction material different from the base material is provided in the feedthrough on the inside of the bearing body, defining a sliding guide lying within the feedthrough. The sliding bearing includes at least one hollow-cylinder-like sliding element made from the antifriction material. The sliding element is arranged in the feedthrough of the bearing body and defines the sliding guide in a circumferentially closed manner. The sliding element includes on its outside at least one projection, which engages a recess provided on the inside of the bearing body. The sliding element is press fit into the feedthrough of the bearing body.

18 Claims, 1 Drawing Sheet

(56) References Cited

U.S. PATENT DOCUMENTS

Figures 1, 2, 3A, 3B, 3C:
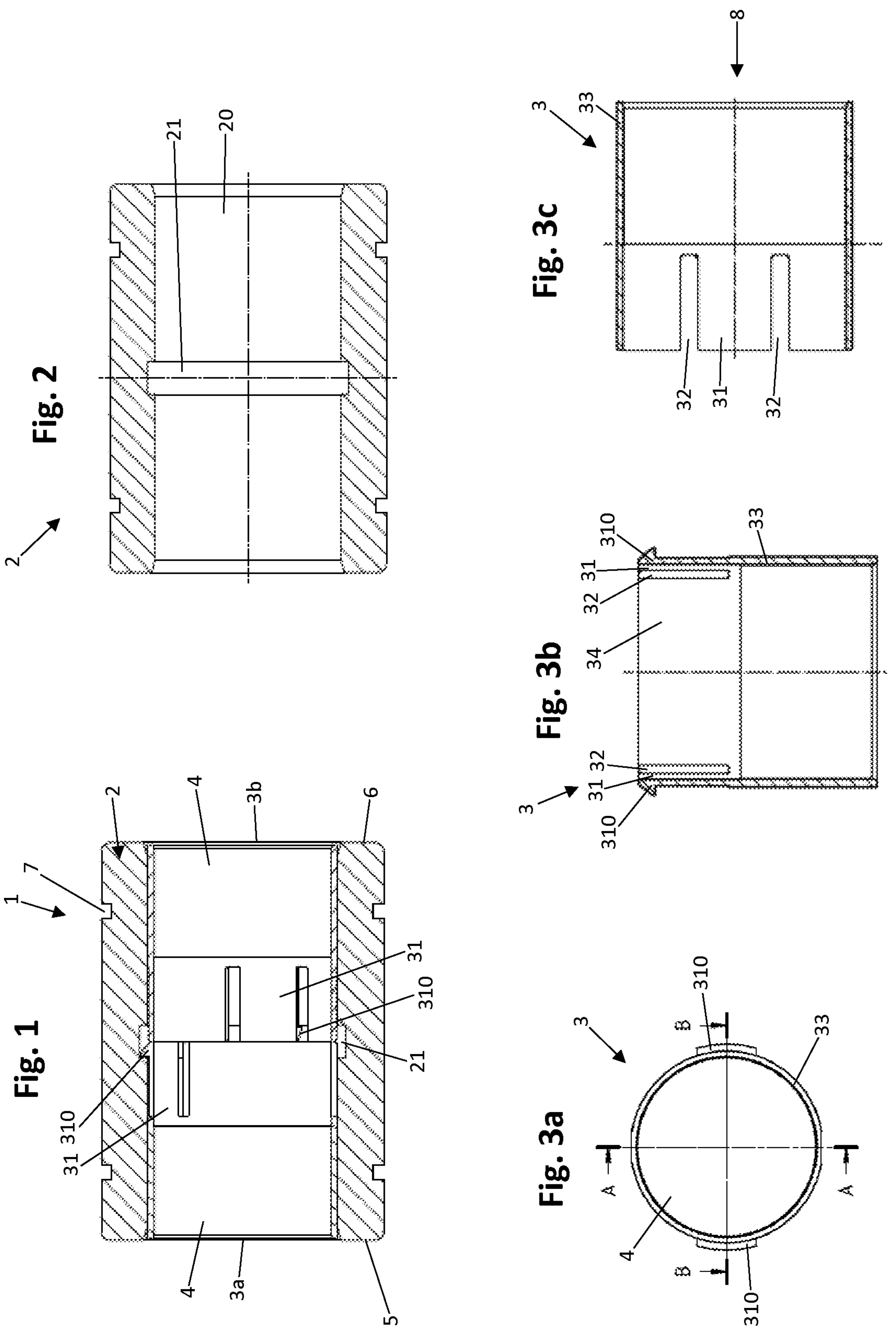

| | | | | |
|---|---|---|---|---|
| 2,372,485 | A | 3/1945 | Griffin | |
| 3,084,003 | A | 4/1963 | Matt et al. | |
| 3,637,273 | A | 1/1972 | Orndorff, Jr. | |
| 9,534,627 | B2 | 1/2017 | Weber | |
| 11,231,071 | B2 * | 1/2022 | Mansfield | F16C 33/102 |
| 2003/0063826 | A1 | 4/2003 | Cevasco et al. | |
| 2010/0111455 | A1 | 5/2010 | Issler et al. | |

FOREIGN PATENT DOCUMENTS

| | | | | |
|---|---|---|---|---|
| DE | 10 2012 109 596 | A1 | 4/2014 | |
| EP | 3190230 | A1 * | 7/2017 | F16C 33/04 |
| JP | S48-19873 | Y | 6/1973 | |
| JP | S5112837 | B1 | 4/1976 | |
| JP | S60-009622 | A | 1/1985 | |
| JP | S60-71730 | U | 5/1985 | |
| JP | 11-198827 | A | 7/1999 | |
| JP | 2002-250357 | A | 9/2002 | |
| KR | 10-2013-0046731 | A | 5/2013 | |
| WO | 2008/124608 | A1 | 10/2008 | |
| WO | 2016/056440 | A1 | 4/2016 | |
| WO | WO-2020039880 | A1 * | 2/2020 | F16H 57/02 |

OTHER PUBLICATIONS

Patent Treaty Cooperation, International Search Report for PCT App. No. PCT/EP2022/059520, Jul. 21, 2022, pp. 1-4.

Patent Treaty Cooperation, Written Opinion for PCT App. No. PCT/EP2022/059520, Jul. 21, 2022, pp. 1-6.

Patent Cooperation Treaty, Preliminary Report on Patentability for PCT App. No. PCT/EP2022/059520, Apr. 13, 2022, pp. 1-20.

Deutsches Patent-und Markenamt, Search Report for DE App. No. 20 2021 101 949.2, May 11, 2021, pp. 1-5.

European Patent Office, English abstract for KR20130046731A, printed on Oct. 3, 2023.

The International Bureau of WIPO, English translation of Preliminary Report on Patentability for PCT App. No. PCT/EP2022/059520, Oct. 12, 2023, pp. 1-6.

Japan Patent Office, Notification of Reasons for Rejection for App. No. 2023-562630, Jun. 24, 2025, pp. 1-5.

Japan Patent Office, Notice of Reasons for Refusal for JP App. No. 2023-562630, Dec. 23, 2025, pp. 1-5.

Taiwan Patent Office, Office Action for Taiwanese App. No. 111113770, Dec. 15, 2025, pp. 1-15.

Canada Patent Office, Office Action for CA 3,216,509, Apr. 17, 2026, pp. 1-5.

* cited by examiner

PRECISION SLIDING BEARING

I. FIELD OF THE INVENTION

The invention relates to a precision sliding bearing.

II. BACKGROUND OF THE INVENTION

A generic sliding bearing comprises a bearing body in the manner of a hollow cylinder made from a base material and extending along a longitudinal axis, which body encloses a feedthrough with its inside, an antifriction material different from the base material being provided in the feedthrough on the inside of the bearing body, which antifriction material encloses a sliding guide lying within the feedthrough. The feedthrough and the sliding guide are usually formed in the manner of a cylinder, the sliding guide lying in the feedthrough having a smaller diameter than the feedthrough and a cylindrical shaft being taken up in the sliding guide in accordance with the intended use, the diameter of which shaft substantially corresponds to the diameter of the sliding guide, in particular deviates from this by less than 0.05 mm, in particular by less than 0.03 mm.

Generic sliding bearings are used in the prior art for the precise sliding guidance of a cylindrical shaft supported in the sliding bearing. In an intended use of a generic sliding bearing, the shaft is taken up in the hollow-cylinder-like bearing body and is displaceable along its longitudinal axis sliding along the antifriction material, while its position perpendicular to the longitudinal axis is fixed by its arrangement in the sliding bearing as precisely as possible and thus with the minimum radial play, in the case of generic sliding bearings usually with a play of less than 0.1 mm, in particular less than 0.05 mm, the sliding bearing and the shaft used preferably being coordinated to one another such that even in the event of loading of the shaft taken up in the sliding bearing and running along the longitudinal axis through the sliding bearing, starting out from an unloaded initial position, with a force, which acts on the shaft relative to the sliding bearing at a longitudinal position of the shaft spaced 10 cm from a longitudinal end of the sliding bearing and in a transverse direction perpendicular to the longitudinal axis and amounts to 40 N, the shaft is deflectable at said longitudinal end of the sliding bearing in the transverse direction only by less than 0.05 mm relative to the initial position. The shaft and in particular the bearing body are mostly made from a metal or a metal alloy, in particular from a steel, a high-grade steel or hard anodized aluminum. Due to the high demands made on the precision of a generic sliding bearing, particular requirements result for the configuration of a sliding bearing and a sliding bearing arrangement. Round shafts are mostly used as shafts, and the feedthrough is accordingly formed in the manner of a cylinder with a round base surface. Furthermore, the antifriction material must be applied to the base material with ideally complete avoidance of play in the feedthrough. Generic sliding bearings are known for this in the prior art in which the antifriction material is present in the form of a permanently applied coating of the inner surface of the bearing body, whereby robustness and precision of the sliding bearing can be guaranteed. Permanent application of the antifriction material, however, means that different bearings with different antifriction materials depending on the purpose of use must be provided for various applications.

Sliding bearings are also known in which the antifriction material is formed as a separate, sleeve-like body, the wall of which has a continuous slot running in the longitudinal direction of the body, so that the sleeve is insertable with elastic deformation of same into the bearing body and is thus held in this under elastic pretensioning, it being possible to take special precautions to fix the sleeve in its intended working position. Such sliding bearings are not suitable as precision sliding bearings, however, as the elasticity necessarily provided and wall thickness of the sleeve-like antifriction material necessarily provided for their stability make a sufficiently precise configuration of the sliding bearing impossible.

A generic sliding bearing is known from U.S. Pat. No. 3,084,003 A. Further prior art is known from US 2003/063826 A1, WO 2008/124608 A1, DE 32 49 706 C2, KR 2013 0046731 A and U.S. Pat. No. 3,637,273 A.

III. SUMMARY OF THE INVENTION

The object of the present invention is to remedy at least one disadvantage of generic sliding bearings and sliding bearing arrangements at least in part.

To achieve this object, the invention proposes that the sliding bearing comprises a sliding element in the manner of a hollow cylinder made from the antifriction material, which element is arranged in the feedthrough of the bearing body and encloses the sliding guide in a circumferentially closed manner and has a wall thickness of preferably less than 1 mm, the sliding element having a projection with which it engages in a recess provided at the inside of the bearing body to fix a relative position, with reference to the longitudinal axis, between the sliding element and the bearing body, and the sliding element is pressed with a radial press fit into the feedthrough of the bearing body. In the sliding bearing according to the invention, in contrast to the configuration of a usual generic sliding bearing, a sliding element separate from the hollow-cylinder-like bearing body is thus provided, which is produced independently of the bearing body and is introduced into the feedthrough to realize the bearing body. The present invention is based on the recognition that even with such a separate sliding element, the realization of a precision sliding bearing is made possible in that the separate sliding element is specially configured and arranged in the feedthrough. On the one hand, the sliding element preferably has a particularly small wall thickness, i.e., a thickness of its hollow cylinder jacket of less than 1 mm, in particular of less than 0.9 mm. A reduction in play of a shaft arranged in the sliding guide is reduced as far as possible hereby. On the other hand, it was recognized that adequate stability of the sliding element, which permits a correspondingly thin configuration of its wall thickness, can be achieved if the sliding element encloses the sliding guide in a circumferentially closed manner and thus uninterruptedly at least in one longitudinal section of the feedthrough. This is because the sliding element can then rest in this longitudinal section with its outer circumference on the feedthrough in a circumferentially closed manner, whereby adequate stability can be generated, in particular if a shaft is arranged in the sliding guide as intended. This longitudinal section lies particularly preferably in a longitudinal end area of the feedthrough, which extends, starting out from a longitudinal end of the feedthrough, over at most 20%, in particular over at most 10% of the longitudinal extension of the feedthrough. The longitudinal end section preferably runs continuously over the entire longitudinal end area of the feedthrough, in particular it extends even beyond the longitudinal end section towards the longitudinal center of the feedthrough. The longitudinal end section preferably extends over at least 30% of the longitudinal extension of the sliding element. Said longitudinal section of the sliding element preferably forms a longitudinal end of the sliding element and is spaced from the opposing longitudinal end along the longitudinal axis by the spring section, the longitudinal extension of the sliding element preferably being formed by the sum of the longitudinal extension of its said longitudinal section and its spring section. Furthermore, it contributes to the advantageous property of the sliding bearing according to the invention to a particular degree that the sliding element both engages with its projection in a recess provided at the inside of the bearing body and thus is fixed in its position along the longitudinal axis relative to the bearing body by a form fit with the bearing body, and is pressed into the feedthrough in a radial press fit. The press fit is preferably a press fit acting in a circumferentially closed manner between feedthrough and sliding element at least over 30% of the longitudinal extension of the sliding element. Radial play of a shaft arranged in the sliding guide is minimized by the press fit. The sliding element is preferably fixed by the engagement of the projection in the recess of the bearing body in such a way along the longitudinal axis relative to the bearing body that the sliding element does not protrude beyond at least an end-face delimitation of the bearing body, i.e. at least one longitudinal end of the bearing body, in particular both end-face delimitations of the bearing body, the sliding element particularly preferably not protruding beyond at least one longitudinal end of the feedthrough, in particular both longitudinal ends of the feedthrough. The sliding element is particularly preferably spaced from at least one longitudinal end of the feedthrough by less than 1 mm. It is generally preferable for the sliding element to be fixed detachably in the feedthrough on the bearing body, in particular removable from the bearing body in that the projection is removed radially from the recess and the sliding element is then drawn, overcoming the friction force acting between bearing body and sliding element, along the longitudinal axis out of the feedthrough.

The sliding bearing according to the invention confers substantial advantages. Due to the provision of a separate sliding element, the sliding element can simply be exchanged in case of servicing without the complete bearing needing to be replaced, as is usual in the case of generic bearings. Furthermore, simple adaptability of the sliding bearing to a desired application environment can be guaranteed by the separate sliding element, as the material of the sliding element can be selected targetedly for the application environment, but sliding bearings suitable for different application environments can each have the same bearing body, so that such different sliding bearings preferably only differ in the material from which the sliding element of the respective sliding bearing is produced. Manufacturing and storage costs can be saved by this. Furthermore, the sliding bearing according to the invention guarantees precise and sturdy guidance of a shaft.

The sliding element can have a jacket part, which is formed in the manner of a hollow cylinder, the projection of the sliding element being formed by a spring section provided at the jacket part and in particular the spring section being spaced from each longitudinal end of the feedthrough by at least 25% of a total length of the feedthrough and/or by at least 20% of a total longitudinal extension of the sliding element along the longitudinal axis. Due to the spacing of the spring section from the longitudinal end of the feedthrough, it is possible, in particular at the level of the longitudinal end of the feedthrough, at which particularly high loading of the sliding element is to be expected in the event of force acting in a transverse direction on a shaft arranged in the sliding guide, to realize particularly high robustness of the sliding element without considering the spring section. The sliding element preferably has a number of projections spaced at a distance from one another in a rotary direction about the longitudinal axis, each of the projections being formed by a spring section separated from the at least one other spring section. The spring section is arranged at the jacket part so that in the event of a force being exerted on the projection relative to the jacket part radially to the longitudinal axis and thus perpendicular to the longitudinal direction, the projection is deflected radially to the longitudinal axis, while the spring section forms a spring force acting counter to the force, the projection returning to its original position again following cancellation of the force. The spring section preferably extends over less than 50%, in particular over 20% to 50% of the total longitudinal extension of the sliding element, whereby both an adequate spring property and adequate stability can be guaranteed.

The spring section can be formed between two slots running along the longitudinal axis and formed in a longitudinal section of the jacket part, and thus delimited by these perpendicular to the longitudinal axis. These slots preferably open into an end face, i.e. longitudinal end of the sliding element, so that the slots are formed as edge openings. This confers the particular advantage that the sliding element can be introduced into the feedthrough with this longitudinal end simply and with the realization of a press fit in the bearing body along the longitudinal axis. Furthermore, the spring section can then be arranged in the realized bearing remote from a longitudinal end of the feedthrough. The spring section preferably extends uninterruptedly between the slots over an angular area, with reference to a rotary angle about the longitudinal axis, of at least 20°, in particular of at least 30°. Particularly high stability can be guaranteed hereby. The spring section preferably extends over an angular area of 20° to 120°, in particular of 30° to 90° between the slots. Adequate elasticity and stability can be encouraged in particular by this. The slots preferably each extend over at most a third of the angular area about the longitudinal axis over which the spring section extends. The sliding element preferably has a number of spring sections, which are spaced from one another by a rotary angle of at least 45°, in particular of at least 60° about the longitudinal axis. The spring sections are preferably delimited perpendicular to the longitudinal axis on both sides respectively by a slot, the jacket part forming a connecting area between two adjacent spring sections in a rotary direction about the longitudinal axis, which area extends from a slot delimiting a first of the two adjacent spring sections to a slot delimiting a second of the two adjacent spring sections. The connecting area preferably extends over an angular area about the longitudinal axis of at least 30°, in particular of at least 60°, in particular of between 30° and 150°, in particular of between 60° and 130°. The jacket part preferably overlaps in the connecting area along the longitudinal axis continuously with the slots delimiting the two adjacent spring sections, in particular with the entire longitudinal extension of the slots, so that it extends along the longitudinal axis along the slots. The described coordination of the width and arrangement of the spring sections is particularly advantageous for the realization of a thin-walled and sufficiently robust sliding element, which is held reliably in the bearing body by radial pressing and axial undercut. The spring sections are preferably distributed uniformly about the longitudinal axis. Preferably two, in particular exactly two spring sections are provided at two radially opposing sides of the jacket part.

The jacket part can have a longitudinal section that encloses the longitudinal axis and thus also the sliding guide in a circumferentially closed manner. Within this entire longitudinal section, the jacket part preferably has a same clear cross-section. This longitudinal section of the jacket part preferably extends over at least 50% of a total longitudinal extension of the sliding element and/or is spaced by less than 10%, in particular by less than 5% of the total longitudinal extension of the sliding element from an absolute longitudinal end of the feedthrough.

At its outside the sliding element preferably has a number of projections, which are arranged distributed along a rotary direction about the longitudinal axis and are preferably directed outwards.

Within its feedthrough, in particular in a central area of the feedthrough with reference to the longitudinal axis, the bearing body can have at least one recess preferably running perpendicular to the longitudinal axis, in which recess the at least one projection engages. The recess preferably extends over at least 50%, in particular at least 70% of the circumference of the feedthrough, preferably in a circumferentially closed manner over the circumference of the feedthrough.

The sliding element is preferably produced from a tribological polymer. A tribological polymer of this kind is a polymer optimized with reference to wear reduction and friction reduction. A tribological polymer of this kind usually has a base polymer, for example the thermoplastics polyethylene, polypropylene, polyacetal, polycarbonate, polyamide, polyvinyl chloride, polytetrafluorethylene and phenol resins in the case of thermosets. Added to this base polymer are fine particles of solid lubricants, for example molybdenum disulphide or graphite, and/or fillers, such as plastic or textile fibers or particles.

According to another proposal of the invention, the sliding bearing can have two sliding element sections, which are arranged adjacent to one another along the longitudinal axis and respectively in the feedthrough and which each have on their outside a projection with which they engage in a recess provided at the inside of the bearing body, in particular they engage jointly in the same recess. The spring sections of both sliding element sections are arranged facing one another along the longitudinal direction in the inner area of the bearing body. Each of the sliding element sections is formed particularly preferably by a sliding element explained as above, so that to realize the sliding bearing, the two sliding elements are inserted respectively from one longitudinal end of the feedthrough along the longitudinal axis into the feedthrough. The use of two sliding element sections, which are inserted independently of one another into the bearing body, makes assembly of the sliding bearing easier. The sliding element sections are preferably formed similarly, but can also be of different length. The sliding bearing preferably has precisely two sliding elements, which each form one of the two sliding element sections. The sliding elements preferably lie next to one another along the longitudinal axis. By resting of the sliding elements against one another, in particular while their projections engage in the area of their longitudinal ends facing one another in a construction provided at the inside of the feedthrough, in particular in the same recess, the sliding bearing can be configured especially robustly. Each of the sliding elements particularly preferably has respectively a longitudinal section as explained above in which it encloses the sliding guide in a circumferentially closed manner, the longitudinal section of a first of the sliding elements lying in a longitudinal end area of the feedthrough lying at a first longitudinal end and the longitudinal section of a second of the sliding elements lying in a longitudinal end area of the feedthrough lying at a second longitudinal end opposite the first longitudinal end.

The bearing body can have circumferential assembly grooves at its outside that are spaced from one another along the longitudinal axis.

Furthermore, the sliding bearing can be formed as a round shaft sliding bearing, so that it is suitable for taking up a cylindrical shaft with a round cross section. A round shaft sliding bearing is particularly advantageous for precise guidance.

The invention further relates to a sliding bearing arrangement comprising a sliding bearing and a cylindrical, in particular circular cylindrical shaft, which is arranged in the sliding opening of the sliding bearing and extends through the feedthrough and rests at the at least one sliding element or sliding element section, in particular rests over at least 50%, in particular at least 70%, in particular at least 80% of its outer surface lying within the feedthrough on the sliding element. The sliding bearing preferably has two sliding elements.

IV. BRIEF DESCRIPTION OF THE DRAWINGS

An exemplary embodiment of the invention is depicted in the figures.

This shows:

FIG. 1: an embodiment of a sliding bearing according to the invention in longitudinal section in a schematic diagram;

FIG. 2: the bearing body of the sliding bearing according to FIG. 1 in longitudinal section in a schematic diagram;

FIG. 3: various views of a sliding element of the sliding bearing according to FIG. 1 in various schematic diagrams.

V. DETAILED DESCRIPTION OF THE DRAWINGS

In FIGS. 1 to 3, an exemplary embodiment of a sliding bearing 1 according to the invention is depicted in an explanatory manner. FIG. 1 shows here a longitudinal section of the overall sliding bearing 1, FIG. 2 shows a longitudinal section of the bearing body 2 and FIG. 3, comprising FIGS. 3*a*, 3*b* and 3*c*, shows various views of one of the two sliding elements 3 used in the sliding bearing 1, which elements are formed identically in the present exemplary embodiment. In the exemplary embodiment depicted in the figures, the bearing body 2 of the sliding bearing 1 is in the form of a sleeve, into the feedthrough 20 of which two sliding elements 3 are inserted, which each form one of two similar sliding element sections 3*a*, 3*b*, which are arranged behind one another in the feedthrough 20 of the bearing body 2 in the longitudinal direction of same in such a way that they form a unit located between the two end faces or longitudinal ends 5, 6 of the bearing body 2, the length of which unit can be equal to that of the bearing body 2. Here the longitudinal ends of the bearing body 2 are also the longitudinal ends of the feedthrough 20. The sliding element sections 3*a*, 3*b* cover the inner jacket surface of the bearing body 2 with the exception of those areas that are not, however, functionally relevant formed by slots or edge openings 32, which are arranged in each sliding element section 3*a*, 3*b* in its longitudinal end area, which lies opposite that of the respectively other sliding element section 3*a*, 3*b*. The slots 32 of each sliding element section 3*a*, 3*b* delimit a spring section 31, which can be deformed more strongly elastically and has at its free end a projection 310 that points outwards and can be formed in the manner of a flange. The bearing body 2 comprises on its outer circumferential assembly, grooves 7 spaced from one another along the longitudinal axis.

The spring section 31 can be formed between two slots 32 running along the longitudinal axis and formed in a longitudinal section of the jacket part 33, and thus delimited by these perpendicular to the longitudinal axis. These slots 32 open into an end face, i.e. longitudinal end of the sliding element 3, so that the slots 32 are formed as edge openings. This confers the particular advantage that the sliding element 3 can be introduced into the feedthrough with this longitudinal end simply and with the realization of a press fit in the bearing body 2 along the longitudinal axis. Furthermore, the spring section 31 can then be arranged in the realized bearing remote from a longitudinal end of the feedthrough. The spring section 31 extends uninterruptedly between the slots 32 over an angular area, with reference to a rotary angle about the longitudinal axis, of at least 20°, in particular of at least 30°. Particularly high stability can be guaranteed hereby. The spring section 31 extends over an angular area of 20° to 120°, in particular of 30° to 90° between the slots. Adequate elasticity and stability can be encouraged in particular by this. The slots 32 preferably each extend over at most a third of the angular area about the longitudinal axis over which the spring section 31 extends. The sliding element 3 has a number of spring sections 31, which are space from one another by a rotary angle of at least 45°, in particular of at least 60° about the longitudinal axis. The spring sections 31 are delimited perpendicular to the longitudinal axis on both sides respectively by a slot 32, the jacket part 33 forming a connecting area 34 between two adjacent spring sections 31 in a rotary direction about the longitudinal axis, which area extends from a slot 32 delimiting a first of the two adjacent spring sections 31 to a slot 32 delimiting a second of the two adjacent spring sections 31. The connecting area 34 extends over an angular area about the longitudinal axis of at least 30°, in particular of at least 60°, in particular of between 30° and 150°, in particular of between 60° and 130°. The jacket part 33 may overlap in the connecting area 34 along the longitudinal axis continuously with the slots 32 delimiting the two adjacent spring sections 31, in particular with the entire longitudinal extension of the slots 32, so that it extends along the longitudinal axis along the slots 32. The described coordination of the width and arrangement of the spring sections 31 is particularly advantageous for the realization of a thin-walled and sufficiently robust sliding element, which is held reliably in the bearing body by radial pressing and axial undercut. The spring sections 31 are distributed uniformly about the longitudinal axis. In particular exactly two spring sections 31 are provided at two radially opposing sides of the jacket part.

The bearing body 2 is provided at its inner jacket surface with an advantageously circumferential recess 21, for example like a groove, which is arranged in the center of the longitudinal extension of the bearing body 2 without the latter being an absolute necessity.

In the assembled state of the sliding bearing 1, which can be gathered from FIG. 1 of the drawings, for instance, the projections 310 of the sliding element sections 3*a*, 3*b*, i.e. of the respective sliding element 3, engage in the recess 21 in the bearing body 2, a common groove-like recess 21 being provided in the specific case for the projections 310 of each sliding element section 3*a*, 3*b*. Two recesses 21 can also be present, however.

A positive-locking connection between the sliding element sections 3*a*, 3*b* of the sliding bearing 1 and the bearing body 2 can be produced easily in each case by the projections 310 engaging in the inner delimiting wall of the bearing body 2, which connection fixes a position of the sliding element sections 3*a*, 3*b* relative to the bearing body 2 along the longitudinal axis.

The assembly of the previously described sliding bearing 1 takes place simply in that a sliding element 3 forming respectively the respective sliding element section 3*a* and 3*b* is inserted from each face end 5, 6 of the bearing body 2 into the opening of the feedthrough 20. To achieve the radial press fit between bearing body 2 and sliding element 3 or its sliding element sections 3*a*, 3*b*, the hollow-cylinder-like sliding element 3 forming the respective sliding element section 3*a*, 3*b* can have an outer diameter that is slightly larger than the inner diameter of the bearing body 2, the end of the respective sliding element 3 provided with the slots 32 being somewhat compressed radially in order to be able to introduce the end-face edge area provided with the slots 32 into the respective opening of the feedthrough 20, this radial compression taking place to the extent that even the enlargement of the outer diameter of the respective sliding element section 3*a*, 3*b* caused by the projections 310 is compensated for.

The drawing indicates that a sliding bearing 1 of a greater length can be produced in the manner described above. By providing two separate sliding elements, which are inserted respectively from a longitudinal end 5, 6 of the bearing body 2 into the feedthrough 20, the assembly of the sliding bearing 1 remains easy despite the connection to be made here by means of a radial press fit.

The bearing body 2 of the sliding bearing 1 can be produced from different materials, e.g., from metals, depending on the conditions in each case. For the sliding element 3, a material suitable for this can be used, which can be a plastic, in particular a tribological polymer. The sliding element 3 forms a sliding guide 4 at its inner side.

LIST OF REFERENCE CHARACTERS

1 sliding bearing
2 bearing body
3 sliding element
3*a*, 3*b* sliding element section
4 sliding guide
5 end face
6 end face
7 assembly groove
8 arrow
20 feedthrough
21 recess
31 spring section
32 slot
33 jacket part
34 connecting area
310 projection

The invention claimed is:

1. A sliding bearing (1) comprising:

a bearing body (2) in a shape of a hollow cylinder having an inner side and an outer side, produced from a base material, and extending along a longitudinal axis, the inner side of the bearing body (2) defining a feedthrough (20);

at least one sliding element (3) made from an antifriction material different from the base material, the sliding element (3) being in a shape of a hollow cylinder having an inner side and an outer side, being press fit into the feedthrough (20) of the bearing body (2), and defining a sliding guide (4) on the inner side; and wherein the bearing body has a recess (21) provided at the inner side of the bearing body (2), wherein the sliding element (3) has on the outer side at least one projection (310), wherein the at least one projection (310) engages in the recess (21) of the bearing body (2) in such a way that the sliding element (3) is fixed in a position along the longitudinal axis relative to the bearing body (2) by a form fit with the bearing body (2), wherein the sliding element (3) includes a jacket part (33) in a shape of a hollow cylinder, wherein the jacket part (33) includes at least two spring sections (31), wherein the projection (310) of the sliding element (3) is formed on at least one of the at least two spring sections (31), and wherein the at least two spring sections (31) are spaced from each longitudinal end of the feedthrough (20) by at least 25% of a total length of the feedthrough (20) along the longitudinal axis, and wherein the jacket part (33) forms a connecting area between two adjacent spring sections (31 in a rotary direction about the longitudinal axis, wherein the connecting area extends over an angle about the longitudinal axis of at least 30°.

2. The sliding bearing (1) according to claim 1, wherein the jacket part (33) extends over a first longitudinal section through which the longitudinal axis passes, wherein the jacket part (33) has a constant cross-section along the entire first longitudinal section.

3. The sliding bearing (1) according to claim 2, wherein the at least one of the at least two spring sections (31) is formed between two slots (32) running along the longitudinal axis and formed in a second longitudinal section of the jacket part (33).

4. The sliding bearing (1) according to claim 2, wherein the first longitudinal section of the jacket part (33) extends over at least 50% of a total longitudinal extension of the sliding element (3) and/or is spaced by less than 10% of the total longitudinal extension of the sliding element (3) from a longitudinal end of the feedthrough (20).

5. The sliding bearing (1) according to claim 1, wherein the at least one projection are multiple projections (310) distributed in a rotary direction about the longitudinal axis.

6. The sliding bearing (1) according to claim 1, wherein the sliding element (3) includes at least two sliding elements (3*a*, 3*b*), which are arranged adjacent to one another along the longitudinal axis and respectively in the feedthrough (20) and which each have at least one projection (310) with which they engage respectively in the recess (21) of the bearing body (2).

7. The sliding bearing (1) according to claim 6, wherein the sliding elements (3*a*, 3*b*) have the same axial length.

8. The sliding bearing (1) according to claim 6, wherein the projections of the at least two sliding elements (3*a*, 3*b*) engage respectively in the same recess (21) on the inner side of the bearing body (2).

9. The sliding bearing (1) according to claim 1, wherein the bearing body (2) includes circumferential assembly grooves (7) on the outer side and spaced from one another along the longitudinal axis.

10. The sliding bearing (1) according to claim 1, wherein the sliding bearing (1) is formed as a round shaft sliding bearing.

11. The sliding bearing according to claim 1, wherein the sliding element (3) is made from a tribological polymer.

12. The sliding bearing (1) according to claim 1, wherein the recess (21) is provided within a central area of the feedthrough (20) with reference to the longitudinal axis.

13. The sliding bearing (1) according to claim 1, wherein the sliding element has a wall thickness of less than 1 mm.

14. A sliding bearing arrangement comprising a sliding bearing (1) according to claim 1 and a cylindrical shaft, which is arranged in the sliding guide (4) of the sliding bearing (1), wherein the cylindrical shaft extends through the feedthrough (20) and rests at the at least one sliding element (3), and at least 50% of an outer surface of the cylindrical shaft lies within the feedthrough (20).

15. A sliding bearing arrangement comprising a sliding bearing (1) according to claim 1 and a cylindrical shaft, which is arranged in the sliding guide (4) of the sliding bearing (1), wherein the cylindrical shaft extends through the feedthrough (20) and rests at the at least one sliding element (3), and at least 70% of an outer surface of the cylindrical shaft lies within the feedthrough (20).

16. A sliding bearing arrangement comprising a sliding bearing (1) according to claim 1 and a cylindrical shaft, which is arranged in the sliding guide (4) of the sliding bearing (1), wherein the cylindrical shaft extends through the feedthrough (20) and rests at the at least one sliding element (3), and at least 80% of an outer surface of the cylindrical shaft lies within the feedthrough (20).

17. A sliding bearing (1) comprising:

a bearing body (2) in a shape of a hollow cylinder having an inner side and an outer side, produced from a base material, and extending along a longitudinal axis, wherein the inner side of the bearing body (2) defines a feedthrough (20);

at least one sliding element (3) made from an antifriction material different from the base material, the sliding element (3) being in a shape of a hollow cylinder having an inner side and an outer side, being press fit into the feedthrough (20), and forming a sliding guide (4) on the inner side of the sliding element (3); and wherein the bearing body (2) defines a recess (21) in the inner side of the bearing body (2), wherein the sliding element (3) has on the outer side at least one projection (310), wherein the at least one projection (310) engages in the recess (21) of the bearing body (2) in such a way that the sliding element (3) is fixed in a position along the longitudinal axis relative to the bearing body (2) by a form fit with the bearing body (2), wherein the at least one projection includes multiple projections (310) distributed in a rotary direction about the longitudinal axis, and wherein the sliding element has a wall thickness of less than 1 mm, wherein the sliding element (3) includes a jacket part (33), and the jacket part (33) includes at least two spring sections (31), wherein the projections (310) of the sliding element (3) are formed on the at least two spring sections, and wherein the jacket part (33) forms a connecting area between two adjacent spring sections (31) in a rotary direction about the longitudinal axis, wherein the connecting area extends over an angle about the longitudinal axis of at least 30°.

18. A sliding bearing (1) comprising:

a bearing body (2) in a shape of a hollow cylinder having an inner side and an outer side, produced from a base material and extending along a longitudinal axis, wherein the inner side of the bearing body (2) defines a feedthrough (20);

at least one sliding element (3) made from an antifriction material different from the base material, the sliding element (3) being in a shape of a hollow cylinder having an inner side and an outer side, being press fit into the feedthrough (20) of the bearing body (2), and forming a sliding guide (4) on the inner side of the sliding element (3); and wherein the bearing body defines a recess (21) in the inner side of the bearing body (2), wherein the sliding element (3) has on the outer side of the sliding element (3) at least one projection (310), wherein the at least one projection (310) engages in the recess (21) of the bearing body (2) in such a way that the sliding element (3) is fixed in a position along the longitudinal axis relative to the bearing body (2) by a form fit with the bearing body (2), and wherein the sliding element (3) includes two sliding elements (3*a*, 3*b*), which are arranged adjacent to one another along the longitudinal axis and respectively in the feedthrough (20) and which each of the two sliding elements have at least one projection (310) with which the sliding element (3) engages respectively in the recess (21) of the bearing body (2), wherein each of the two sliding elements (3) includes a jacket part (33), and the jacket part (33) includes at least two spring sections (31), wherein the at least one projection (310) of the sliding element (3) is formed on at least one of the at least two spring sections, wherein at least two of the spring sections (31) are included in the jacket part (33), and wherein the jacket part (33) forms a connecting area between two adjacent spring sections (31) in a rotary direction about the longitudinal axis, wherein the connecting area extends over an angle about the longitudinal axis of at least 30°.

* * * * *